3,386,996
PROCESS FOR PRODUCING CERTAIN 8-HYDROXY
OR LOWER - ALKOXY - (4 - PYRIDYL LOWER-
ALKYLIDENE) - 1,2,3,4 - TETRAHYDRO - NAPH-
THALENES; 8-HYDROXY OR LOWER-ALKOXY-
(4 - PYRIDYL LOWER - ALKYL) - 3,4 - DIHYDRO-
NAPHTHALENES AND DERIVATIVES THEREOF
Don M. Lynch, Waukegan, and John W. Cole, Deerfield,
Ill., assignors to Abbott Laboratories, North Chicago,
Ill., a corporation of Illinois
No Drawing. Filed Dec. 30, 1965, Ser. No. 517,818
10 Claims. (Cl. 260—240)

The present invention is directed to new naphthalenes substituted in the 1- and 6-positions which exhibit steroid-like activities.

The compounds of the present invention are the naphthalene derivatives of the formula

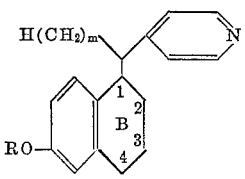

wherein the B-ring has a partial structure of

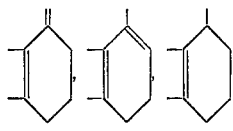

or

and wherein R is $H(CH_2)_n$ or $H(CH_2)_nCO$, $n$ is an integer from 0 to 4 and $m$ is an integer from 0 to 2 inclusive, and acid addition salts thereof. The new compounds show fungistatic activity.

The new compounds are prepared by condensing a 6-lower alkoxy-1-tetralone with a pyridine of the formula

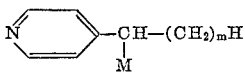

wherein $m$ is an integer from 0 to 2 and wherein M is an alkali metal, in the presence of an anhydrous inert organic solvent at a temperature between 0° and 100° C. under anhydrous conditions for a period of at least 15 minutes. The resulting condensation product is mixed with water and separated from inorganic material. The solvent is then removed by distillation to leave a mixture of two isomeric compounds, one carrying a double bond in the ring system between positions 1 and 2 of the naphthalene ring, and the other carrying a double bond between the naphthalene ring and the exocyclic carbon atom. Hydrogenation of this mixture produces the corresponding tetralin derivative which can then be modified at the 6-position by cleavage of the methoxy group resulting in 6-hydroxy - 1 - (4-pyridylalkyl)-1,2,3,4-tetrahydronaphthalene. Alternately, the methoxy group can be replaced first by the hydroxy group and the corresponding 6-hydroxy compound is then hydrogenated to the above tetrahydronaphthalene. The hydroxy group may be esterified by standard methods with the active derivatives of an organic carboxylic acid of the formula $H(CH_2)_nCOOH$, for example acetic anhydride or butyryl chloride. Also, the C-1 unsaturated compound may be oxidized to the fully aromatic naphthalene ring in which the 6-substituent can similarly be modified.

The above reference to an anhydrous inert organic solvent indicates that the reaction medium is to be water-free and selected in such a way that it does not react with either starting material or the end product. For example, the solvent may be toluene, benzene or a pyridine derivative of the above-illustrated formula wherein M is hydrogen.

To illustrate the preparation of the new compounds, reference is made to the following examples which are not intended to limit the invention in any respect.

Example 1.—6-methoxy-1-(4-pyridylmethylidene) - 1,2,3, 4 - tetrahydronaphthalene and 6 - methoxy-1-(4-pyridyl-methyl)-3,4-dihydronaphthalene To 250 ml. of liquid ammonia containing a crystal of ferric nitrate is added 10.05 g. of sodium in small portions under stirring and under cooling in a Dry Ice/acetone bath. After completion of the sodium addition, 42.5 ml. (40.65 g.) of γ-picoline is dropwise added with stirring over a 10-minute period. After 15 minutes, the cooling bath is removed and the initially present Dry Ice condenser is replaced by an air condenser. Dry ether (100 ml.) is added dropwise while the ammonia evaporates. The reaction vessel is then placed in a hot-water bath to drive off the remaining ammonia. The residual dark oil is cooled in an ice bath and 25 g. of 6-methoxy-1-tetralone in 85 ml. of γ-picoline is added rapidly. The mixture is stirred overnight at room temperature and then poured into ice. The dark oil obtained is extracted with ether containing a small portion of chloroform to keep a white, ether-insoluble solid in solution. The ether extract is washed with water and dried over anhydrous magnesium sulfate. Removal of the solvent under reduced pressure leaves 38 g. of an amber oil. The last traces of γ-picoline are removed by distillation at a pressure of 1.3 mm. Hg. until the vapor temperature reaches 130° C. The residue is taken up in 10% aqueous hydrochloric acid and filtered with suction to remove any unreacted tetralone.

The acidic filtrate is made alkaline by adding 20% aqueous sodium hydroxide and extracted with ether. The ether extract is washed with water and dried over anhydrous magnesium sulfate. Removal of the solvent under reduced pressure leaves 25.68 g. of a mixture of 6-methoxy - 1-(4-pyridylmethylidene) - 1,2,3,4-tetrahydronaphthalene and 6-methoxy-1-(4-pyridylmethyl) - 3,4-dihydronaphthalene as a yellow-brown oil which is dissolved in absolute ethanol. After adding ethereal-hydrochloric acid, a crude yellow solid is obtained which is identified by analysis, infrared and nuclear magnetic resonance (NMR) spectra as a 50–50 mixture of the hydrochlorides of 6-methoxy - 1-(4-pyridylmethylidene) - 1,2,3,4-tetrahydronaphthalene and 6-methoxy-1-(4-pyridylmethyl) - 3,4-dihydronaphthalene.

When in a repetition of this procedure, commercially available sodamide is used, the same product mixture is obtained but at a somewhat lower yield.

Example 2.—6-methoxy-1-(4-pyridyl-1-ethyl)-3,4-dihydronaphthalene

By replacing the γ-picoline in Example 1 with 4-ethylpyridine, a crude product is obtained of which the NMR spectrum confirms that it includes some by-products. The mixture is placed on a column of silica gel and eluted with ether. The contaminants remain on the column and the ether eluate is worked up to white crystals of 6-methoxy-1-(4-pyridyl-1-ethyl) - 3,4-dihydronaphthalene melting at 73–75° C. after recrystallization from benzene/hexane. The analytical values are in good agreement with those calculated for empirical formula $C_{18}H_{19}NO$. The hydrochloride melts at 150–153° C. The NMR spectrum of the free base shows a methyl doublet at 88.5 c.p.s. (J=7 c.p.s.), a 1-proton quartet at 242.5 c.p.s. (J=7 c.p.s.) and a vinyl hydrogen triplet at 356 c.p.s. (J=4 c.p.s.).

By replacing the 4-ethylpyridine in the above process with 4-propylpyridine, 6-methoxy - 1-(4-pyridyl - 1-n-propyl)-3,4-dihydronaphthalene is obtained.

Example 3.—6-methoxy-1-(4-pyridylmethyl)-1,2,3,4-tetrahydronaphthalene

Six g. of the mixture obtained in Example 1 is hydrogenated at 50–60° C. under 30–40 lbs. pressure in methanol, using a palladium-on-carbon catalyst. After removing the catalyst by filtration and evaporation of the solvent, 5.66 g. of an amber oil is obtained. Dissolving this oil in ethanol and adding etheral hydrochloric acid gives 5.79 g. of the hydrochloride of 6-methoxy-1-(4-pyridylmethyl) - 1,2,3,4-tetrahydronaphthalene as white crystals melting at 215–217° C. The analytical sample melts at 216–218° C. and shows analytical values in good agreement with those calculated for the formula $C_{17}H_{20}ClNO$. The free amine is obtained as a colorless oil boiling at 199.5–200.5° C./3 mm. Hg.

Example 4.—6-methoxy-1-(4-pyridyl-1-ethyl)-1,2,3,4-tetrahydronaphthalene 10.21 g. of 6-methoxy - 1-(4-pyridyl-1-ethyl) - 3,4-dihydronaphthalene from Example 2 is hydrogenated in ethanol by the method shown in Example 3, producing 10.19 g. of a colorless oil. Distillation of this oil at 1.8 mm. Hg. pressure produces 9.50 g. of 6-methoxy-1-(4-pyridyl-1-ethyl) - 1,2,3,4-tetrahydronaphthalene boiling at 185–188.5° C. of which the analytical values are in good agreement with those calculated for $C_{18}H_{21}NO$. The hydrochloride of this compound has a melting point of 145–152° C.

By hydrogenating 6-methoxy-1-(4-pyridyl-1-n-propyl)-3,4-dihydronaphthalene in the above manner, 6-methoxy-1 - (4-pyridyl-1-n-propyl) - 1,2,3,4-tetrahydronaphthalene is obtained.

Example 5.—6-hydroxy-1-(4-pyridylmethylidene)-1,2,3,4-tetrahydronaphthalene and 6-hydroxy - 1-(4-pyridylmethyl) - 3,4-dihydronaphthalene 2.0 g. of the mixture of Example 1 is heated with 6.5 g. of commercial pyridine hydrochloride under stirring and in a nitrogen atmosphere for 40 minutes at 205–210° C. After cooling, the reaction product is diluted with 25 ml. of water, made alkaline with 5% aqueous sodium hydroxide and shaken with ether. The organic layer is removed and the aqueous alkaline solution is acidified with Dry Ice and extracted with ether. The ether extract is washed with water and dried over anhydrous magnesium sulfate. Removal of the solvent under reduced pressure leaves 0.27 g. of a light yellow solid. Crystallization of this solid from ethanol/benzene/hexane gives 263 mg. of 6-hydroxy - 1-(4-pyridylmethylidene) - 1,2,3,4-tetrahydronaphthalene and 6-hydroxy-1-(4-pyridylmethyl) - 3,4-dihydronaphthalene as a cream-colored solid melting at 191–195° C. The NMR spectrum shows that the mixture contains about 60% of the tetrahydro- and about 40% of the dihydronaphthalene. The analytical values are in good agreement with those calculated for $C_{16}H_{15}NO$.

Example 6.—6-hydroxy-1-(4-pyridylmethyl)-1,2,3,4-tetrahydronaphthalene

In a repetition of Example 5 but using as a starting material 6-methoxy-1-(4-pyridylmethyl) - 1,2,3,4-tetrahydronaphthalene from Example 3 produces 56% yield of 6-hydroxy - 1-(4-pyridylmethyl) - 1,2,3,4-tetrahydronaphthalene as white crystals which, after crystallization from 95% ethanol melt at 187–189° C. The analytical values are in good agreement with those calculated for the compound of the formula $C_{16}H_{17}NO$.

Example 7.—6-hydroxy-1-(4-pyridyl-1-ethyl)-3,4-dihydronaphthalene

By using the process of Example 5 with the compound described in Example 2, a 56% yield of cream-colored crystals of 6-hydroxyl-1-(4-pyridyl-1-ethyl) - 3,4-dihydronaphthalene is obtained. The recrystallized compound melts at 185–188° C. and has a NMR spectrum consistent with the assigned structure. The analytical values are in good agreement with those calculated for $C_{17}H_{17}NO$.

Example 8.—6-methoxy - 1-(4-pyridylmethyl)naphthalene

When the mixture of tetrahydro-and dihydronaphthalenes of Example 1 is heated with two molar equivalents of sulfur by the procedure described in Organic Synthesis, Collective, vol. III, page 729 (John Wiley & Sons, N.Y. 1955) there is obtained 6-methoxy-1-(4-pyridylmethyl) naphthalene of formula $C_{17}H_{15}NO$.

As will be readily understood by those skilled in the art, the above compounds easily form acid addition salts with strong acids such as mineral acids. Among the mineral acids, those which are pharmaceutically acceptable are preferred; e.g., the hydrochloride, sulfate and phosphate salts.

The new compounds, as free bases or as their acid-addition salts, show fungistatic activity against *Chaetomium globsosum*, *Myothecium verrucaria*, *Aspergillus versicolor*, *Penicillium citrinum*, *Fusarium oxysporum*, *Alternaria species*, *Rhizopus nigricans Morton*, and others, at a concentration of 10–100 parts per million.

Others may practice the invention in any of the numerous ways which will be suggested to one skilled in the art by the present disclosure. All such practice of the invention is considered to be a part hereof provided it falls within the scope of the appended claims.

We claim:

1. The process of condensing a pyridine derivative of the formula

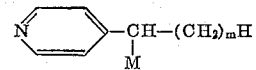

wherein $m$ is an integer of from 0 to 2 and wherein M is an alkali metal, with 6-lower-alkoxy-tetralone in the presence of an anhydrous, inert, organic solvent at a temperature between 0° and 100° C. under anhydrous conditions for a period of at least 15 minutes to yield 6-lower-alkoxy - 1-(4-pyridyl-lower-alkylidene) - 1,2,3,4-tetrahydronaphthylene and 6-lower-alkoxy - 1-(4 - pyridyl-lower-alkyl)-3,4-dihydronaphthylene tautomers.

2. The process of claim 1 wherein said organic solvent is the pyridine derivative of claim 1 wherein M is hydrogen.

3. The process of claim 1 wherein said pyridine derivative is 4-pyridylmethyl sodium and said organic solvent is γ-picoline.

4. A naphthalene derivative of the formula

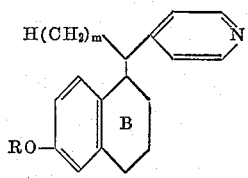

wherein the B-ring has a partial structure of

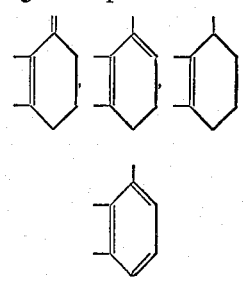

or and wherein R is H(CH$_2$)$_n$ or H(CH$_2$)$_n$CO, $n$ is an integer from 0 to 4 and $m$ is an integer from 0 to 2 inclusive, and an acid addition salt thereof.

5. A naphthalene derivative as defined in claim 4 wherein both, $n$ and $m$, are 0 and wherein the B-ring carries a double bond at the 1-position.

6. A naphthalene derivative as defined in claim 4 wherein both, $n$ and $m$, are 0 and wherein the carbon atom in the 1-position carries a hydrogen atom.

7. A naphthalene derivative as defined in claim 4 wherein $n=1$, $m=0$ and the carbon atom in the 1-position carries a hydrogen atom.

8. A naphthalene derivative as defined in claim 4 wherein $n=1$, $m=0$, and the B-ring carries a double bond at the 1-position.

9. A naphthalene derivative as defined in claim 4 wherein each $n$ and $m$ is 1 and wherein the carbon atom at the 1-position carries a hydrogen atom.

10. A naphthalene derivative as defined in claim 4 wherein each $n$ and $m$ is 1 and wherein the B-ring carries a double bond at the 1-position.

References Cited

Gray et al.; J. Am. Chem. Soc., vol. 79, pp. 3805–8 (1957).

JOHN D. RANDOLPH, *Primary Examiner.*

AL ROTMAN, *Assistant Examiner.*